(12) United States Patent
Tomozawa et al.

(10) Patent No.: US 12,084,046 B2
(45) Date of Patent: Sep. 10, 2024

(54) DRIVING ASSISTANCE DEVICE AND VEHICLE

(71) Applicants: AISIN CORPORATION, Aichi (JP); TOYOTA JIDOSHA KABUSHIKI KAISHA, Toyota (JP)

(72) Inventors: Motokatsu Tomozawa, Kariya (JP); Tsutomu Mochida, Toyota (JP); Shinya Otani, Nagoya (JP); Shinya Sannodo, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 17/953,897

(22) Filed: Sep. 27, 2022

(65) Prior Publication Data

US 2023/0101237 A1 Mar. 30, 2023

(30) Foreign Application Priority Data

Sep. 29, 2021 (JP) .................................. 2021-159890

(51) Int. Cl.
*B60W 30/06* (2006.01)
*B60W 50/14* (2020.01)
*G05D 1/00* (2024.01)

(52) U.S. Cl.
CPC ............ *B60W 30/06* (2013.01); *B60W 50/14* (2013.01); *G05D 1/0016* (2013.01); *B60W 2050/146* (2013.01); *B60W 2554/4041* (2020.02); *B60W 2556/45* (2020.02)

(58) Field of Classification Search
CPC . B60W 30/06; B60W 50/14; B60W 2050/146
See application file for complete search history.

(56) References Cited

FOREIGN PATENT DOCUMENTS

JP 2021-062754 A 4/2021

*Primary Examiner* — Nabil H Syed
*Assistant Examiner* — Cal J Eustaquio
(74) *Attorney, Agent, or Firm* — Sughrue Mion, PLLC (57) ABSTRACT

A driving assistance device provides driving assistance to a vehicle including a sensor that collects peripheral information according an instruction from a terminal of a user of the vehicle, the device including: a route calculation unit that calculates a movement route of the vehicle to a target position based on the peripheral information; a detection unit that detects an obstacle at a periphery of the vehicle moving through the movement route based on the peripheral information; and a movement control unit that moves the vehicle along the movement route; where the movement control unit temporarily interrupts the driving assistance and waits until the obstacle moves from a position that hinders the movement when the obstacle is detected at a position hindering the movement of the vehicle on the movement route and a length of the movement route shortened by the obstacle is longer than or equal to a predetermined distance.

6 Claims, 8 Drawing Sheets

DRIVING ASSISTANCE DEVICE AND VEHICLE

CROSS REFERENCE TO RELATED APPLICATIONS

This application is based on and claims priority under 35 U.S.C. § 119 to Japanese Patent Application No. 2021-159890, filed on Sep. 29, 2021, the entire content of which is incorporated herein by reference.

TECHNICAL FIELD

The present disclosure relates to a driving assistance device and a vehicle.

BACKGROUND DISCUSSION

A known driving assistance device that provides driving assistance at the time of entering and exiting of a vehicle is disclosed in Japanese Unexamined Patent Publication No. 2021-062754. In the driving assistance device, a movement route of the vehicle to entering or exiting is calculated, and the vehicle is moved based thereon. While the vehicle is moving, an obstacle that hinders the movement of the vehicle is detected based on peripheral information of the vehicle acquired by a sensor attached to the vehicle, and the movement route is recalculated so as to avoid contact with the obstacle, or driving assistance is canceled.

In recent years, a driving assistance device that remotely provides driving assistance for entering and exiting in a state where a driver has got off a vehicle has been developed. In such a driving assistance device, there are some cases where a user such as a driver enters a movement route of a vehicle to grasp a movement situation of the vehicle, or the like. As a result, driving assistance may be canceled.

A need thus exists for a driving assistance device and a vehicle which are not susceptible to the drawback mentioned above.

SUMMARY

A driving assistance device is a driving assistance device that provides driving assistance to a vehicle including a sensor that collects peripheral information in accordance with an instruction from a terminal possessed by a user of the vehicle, the driving assistance device including: a route calculation unit that calculates a movement route of the vehicle to a target position based on the peripheral information from the sensor; a detection unit that detects an obstacle at a periphery of the vehicle moving through the movement route based on the peripheral information from the sensor; and a movement control unit that moves the vehicle along the movement route; where the movement control unit temporarily interrupts the driving assistance and waits for a predetermined time until the obstacle moves from a position that hinders the movement when the obstacle is detected at a position that hinders the movement of the vehicle on the movement route and a length of the movement route shortened by the obstacle is longer than or equal to a predetermined distance.

A vehicle is a vehicle mounted with a sensor that collects peripheral information and a driving assistance device that provides driving assistance in accordance with an instruction from a terminal possessed by a user, the driving assistance device including: a route calculation unit that calculates a movement route of the vehicle to a target position based on the peripheral information from the sensor; a detection unit that detects an obstacle at a periphery of the vehicle moving through the movement route based on the peripheral information from the sensor; and a movement control unit that moves the vehicle along the movement route, where the movement control unit temporarily interrupts the driving assistance and waits for a predetermined time until the obstacle moves from a position that hinders the movement when the obstacle is detected at a position that hinders the movement of the vehicle on the movement route and a length of the movement route shortened by the obstacle is longer than or equal to a predetermined distance.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Similar components in the following exemplary embodiments and the like are denoted by the same reference numerals, and redundant description will be omitted as appropriate.

(Configuration Example of Vehicle)

Figure 1:
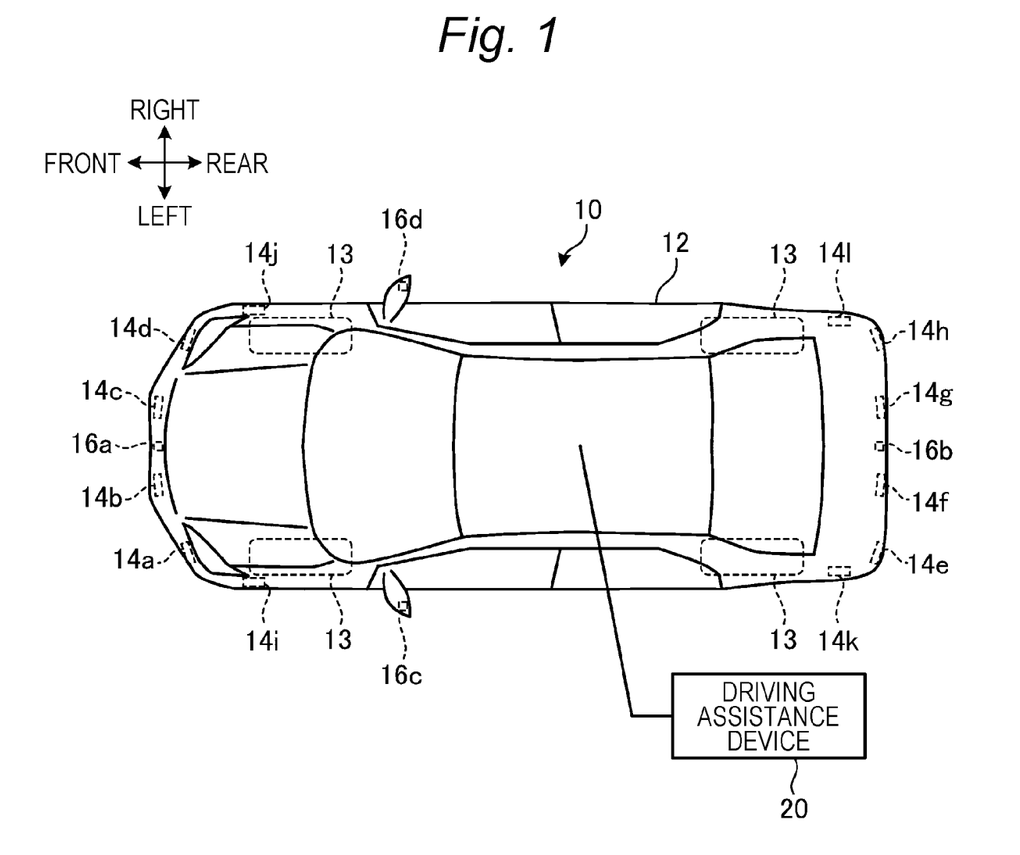
FIG. 1 is a top view of a vehicle on which a driving assistance device according to an embodiment is mounted.

FIG. 1 is a top view of a vehicle 10 on which a driving assistance device 20 according to an embodiment is mounted. Front, rear, left, and right of the vehicle 10 in FIG. 1 indicate directions as viewed from a driver's seat of the vehicle 10.

The vehicle 10 of the embodiment may be, for example, an internal combustion engine vehicle using an internal combustion engine as a drive source, an electric vehicle, a fuel cell vehicle, or the like using an electric motor as a drive source, or a hybrid vehicle using both of them as drive sources.

In addition, the vehicle 10 can be mounted with various transmission devices, and can be mounted with devices such as various systems and components necessary for driving the internal combustion engine or the electric motor. In addition, the type, number, layout, and the like of devices related to the driving of the wheels 13 in the vehicle 10 can be variously set.

As illustrated in FIG. 1, the vehicle 10 includes a vehicle body 12, a plurality of wheels 13, a plurality of distance measuring units 14a to 14l, and a plurality of imaging units 16a to 16d. Note that, in a case where it is not necessary to distinguish the distance measuring units 14a to 14l, they are simply referred to as the distance measuring unit 14. Furthermore, in a case where it is not necessary to distinguish the imaging units 16a to 16d, they are simply referred to as the imaging unit 16.

The vehicle body 12 constitutes a vehicle compartment in which an occupant rides. A plurality of wheels 13, a plurality of distance measuring units 14, and a plurality of imaging units 16 are attached to the vehicle body 12. In the example of FIG. 1, the vehicle body 12 includes four wheels 13, 12 distance measuring units 14, and four imaging units 16. However, the number of distance measuring units 14 and imaging units 16 attached to the vehicle body 12 is arbitrary.

The four wheels 13 are provided on the front, rear, left, and right of the vehicle body 12. The two wheels 13 on the front side function as, for example, turning wheels, and the two wheels 13 on the rear side function as, for example, drive wheels.

The distance measuring unit 14 serving as a sensor is, for example, a sonar that is provided on the outer peripheral portion of the vehicle 10, transmits a sound wave such as an ultrasonic wave as a detection wave, and captures the detection wave reflected by an object such as an obstacle present at a periphery of the vehicle 10. Note that the distance measuring unit 14 may be a radar that transmits a detection wave such as laser light, a millimeter wave radar, or the like.

The distance measuring unit 14 collects peripheral information, which is information of the periphery of the vehicle 10, and outputs the peripheral information to the driving assistance device 20. For example, the distance measuring unit 14 collects a response time, which is a time from transmission to reception of the detection wave, as peripheral information for specifying a distance between the object and the vehicle 10. The driving assistance device 20 can detect the presence or absence of an obstacle or the like at the periphery of the vehicle 10 and the distance to the obstacle based on the peripheral information collected by the distance measuring unit 14.

Note that, in a case where the distance measuring unit 14 receives a plurality of detection waves reflected by a plurality of points of the object with respect to one transmission of the detection wave, only the response time of the detection wave received the earliest may be included in the peripheral information.

The distance measuring units 14a to 14d are provided in a front portion of vehicle body 12. Among these distance measuring units 14a to 14d, the distance measuring units 14b and 14c are also called front sonars and are provided at the front end portion of the vehicle 10. The distance measuring units 14b and 14c detect an object in front of the vehicle 10 and collect peripheral information of the front side of the vehicle 10. In addition, the distance measuring units 14a and 14d are also called corner sonars, and are provided at corner portions of the front portion of the vehicle 10. The distance measuring units 14a and 14d detect an object on the front outer side of the vehicle 10 and collect peripheral information of the front outer side of the vehicle 10.

The distance measuring units 14e to 14h are provided at the rear portion of the vehicle body 12. Among these distance measuring units 14e to 14h, the distance measuring units 14f and 14g are also called rear sonars and are provided at the rear end portion of the vehicle 10. The distance measuring units 14f and 14g detect an object behind the vehicle 10 and collect peripheral information of the rear side of the vehicle 10. In addition, the distance measuring units 14e and 14h are also called corner sonars, and are provided at corner portions of the rear portion of the vehicle 10. The distance measuring units 14e and 14h detect an object on the rear outer side of the vehicle 10 and collect peripheral information of the rear outer side of the vehicle 10.

The distance measuring units 14i to 14l are also called side sonars and are provided at a side portion of the vehicle body 12. Among the distance measuring units 14i to 14l, the distance measuring units 14i and 14j are provided on the side of the front portion of the vehicle 10. The distance measuring units 14k and 14l are provided on the side of the rear portion of the vehicle 10. The distance measuring units 14i to 14l detect an object on the side of the vehicle 10 and collect peripheral information of the side of the vehicle 10.

The imaging unit 16 serving as a sensor is, for example, a digital camera incorporating an imaging element such as a charge coupled device (CCD) or a CMOS image sensor (CIS). The imaging unit 16 generates an imaged image of a moving image or a still image including a plurality of frame images captured at a predetermined frame rate.

The imaging unit 16 is provided on the outer peripheral portion of the vehicle body 12 and includes a wide-angle lens or a fisheye lens, and for example, can capture a range of 140° to 190° in the horizontal direction. The optical axis of the imaging unit 16 is set obliquely downward.

As a result, imaging unit 16 collects peripheral information obtained by imaging the periphery of vehicle 10 including the road surface, and outputs the peripheral information to the driving assistance device 20. The driving assistance device 20 can detect the presence or absence of an obstacle or the like at the periphery of the vehicle 10 and the position of the obstacle based on the peripheral information collected by the imaging unit 16. Furthermore, the driving assistance device 20 can detect a parking section at the periphery of the vehicle 10 and a position of the parking section based on the peripheral information collected by the imaging unit 16.

The imaging unit 16a is provided at the central part in the left-right direction of the front end portion of the vehicle body 12, for example, at the front bumper. The imaging unit 16a collects an imaged image obtained by imaging the front side of vehicle 10 as the peripheral information. The imaging unit 16b is provided at a central part in the left-right direction of the rear end portion of the vehicle body 12, for example, at the rear bumper. The imaging unit 16b collects an imaged image obtained by imaging the rear side of the vehicle 10 as the peripheral information.

The imaging unit 16c is provided at a central part in the front-rear direction of the left end portion of the vehicle body 12, for example, at a side mirror on the left side. The imaging unit 16c collects an imaged image obtained by imaging the left side of the vehicle 10 as the peripheral information. The imaging unit 16d is provided at a central part in the front-rear direction of the right end portion of the vehicle body 12, for example, at a side mirror on the right side. The imaging unit 16d collects an imaged image obtained by imaging the periphery of the right side of the vehicle 10 as the peripheral information.

(Configuration Example of Driving Assistance System)

Figure 2:
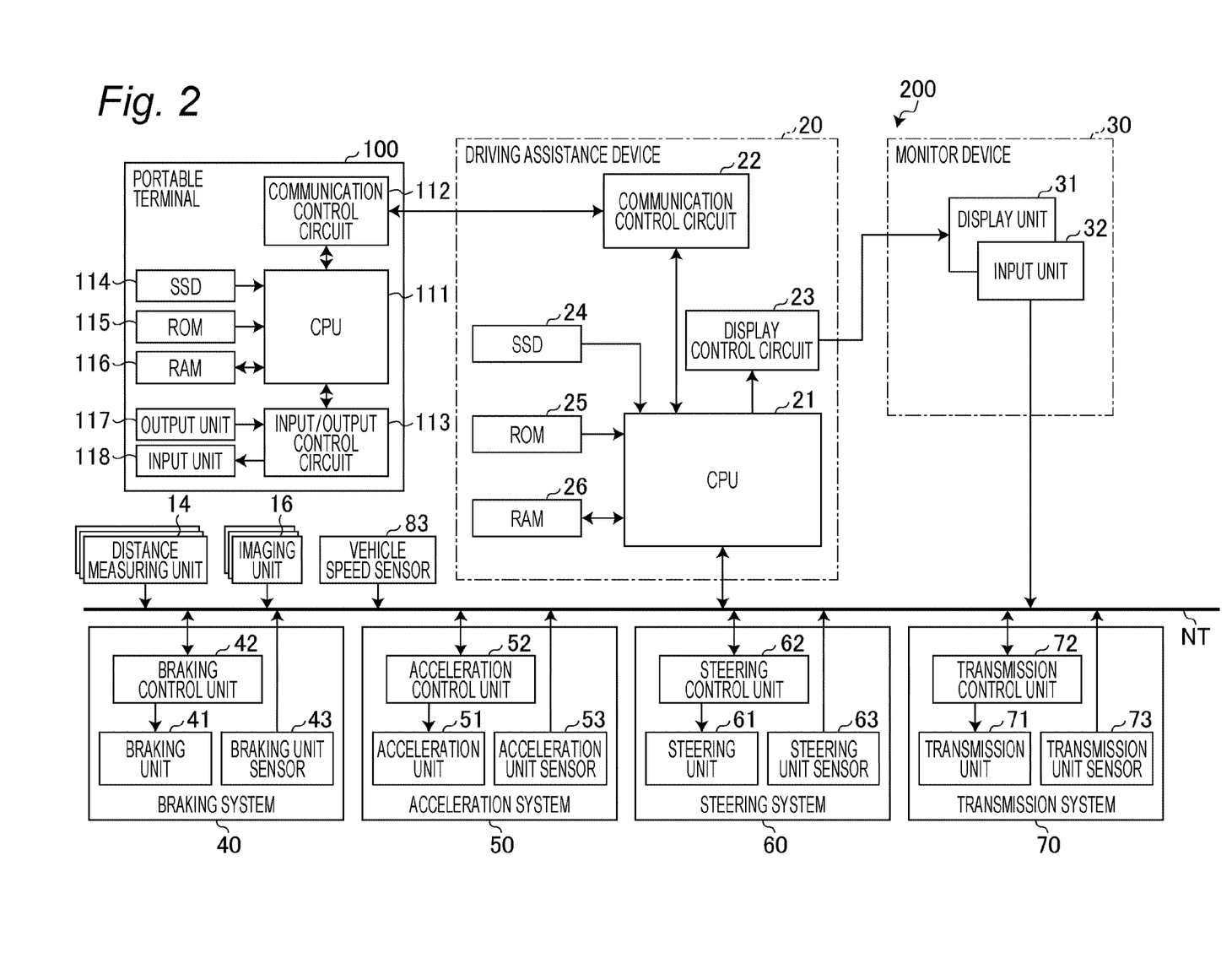
FIG. 2 is a block diagram illustrating an example of an overall configuration of a driving assistance system according to the embodiment.

FIG. 2 is a block diagram illustrating an example of an overall configuration of a driving assistance system 200 according to the embodiment. The driving assistance system 200 is mounted on the vehicle 10, for example, and remotely performs driving assistance such as entering into a parking section or exiting from the parking section of the vehicle 10 in a state where the driver has got off from the vehicle 10.

As illustrated in FIG. 2, the driving assistance system 200 includes a driving assistance device 20, a monitor device 30, a braking system 40, an acceleration system 50, a steering system 60, a transmission system 70, a vehicle speed sensor 83, a distance measuring unit 14, and an imaging unit 16. These configurations are connected by an in-vehicle network NT so as to be able to transmit and receive information to and from each other.

The in-vehicle network NT is configured to include, for example, a controller area network (CAN), a local interconnect network (LIN), and the like. The in-vehicle network NT may be included in a part of the driving assistance system 200.

In addition, the driving assistance system 200 is connected to a portable terminal 100 possessed by a user such as a driver of the vehicle 10 so as to be able to transmit and receive information to and from each other via a wireless line such as the Internet.

The driving assistance device 20 is configured as a microcomputer such as an electronic control unit (ECU), and provides driving assistance of the vehicle 10.

The driving assistance device 20 includes a central processing unit (CPU) 21, a communication control circuit 22, a display control circuit 23, a solid state drive (SSD) 24, a read only memory (ROM) 25, and a random access memory (RAM) 26. The CPU 21, the ROM 25, and the RAM 26 may be integrated in the same package.

The CPU 21 is an example of a hardware processor, reads a program stored in a nonvolatile storage device such as the ROM 25, and executes various arithmetic processing and control according to the program.

The ROM 25 stores various programs, parameters necessary for executing the programs, and the like. The RAM 26 temporarily stores various data used in the calculation by the CPU 21. The SSD 24 is a rewritable nonvolatile storage device, and maintains data even when the power of the driving assistance device 20 is turned off.

The communication control circuit 22 mainly executes processing related to transmission and reception of information to and from the portable terminal 100 of the arithmetic processing performed by the driving assistance device 20. Among the arithmetic processing performed by the driving assistance device 20, the display control circuit 23 mainly executes image processing of an image obtained by the imaging unit 16, data conversion of an image for display to be displayed on a display unit 31 (to be described later) included in the monitor device 30, and the like.

The braking system 40 includes a braking unit 41, a braking control unit 42, and a braking unit sensor 43, and controls deceleration of the vehicle 10.

The braking unit 41 is a device including, for example, a brake, a brake pedal, and the like, and decelerates the vehicle 10. The braking control unit 42 is, for example, a microcomputer having a hardware processor such as a CPU. The braking control unit 42 controls the braking unit 41 based on an instruction from the driving assistance device 20 to control deceleration of the vehicle 10. The braking unit sensor 43 is, for example, a position sensor, and detects a position of a brake pedal included in the braking unit 41. The braking unit sensor 43 outputs the detected brake pedal position to the in-vehicle network NT.

The acceleration system 50 includes an acceleration unit 51, an acceleration control unit 52, and an acceleration unit sensor 53, and controls acceleration of the vehicle 10.

The acceleration unit 51 is a device including, for example, an accelerator pedal, and accelerates the vehicle 10. The acceleration control unit 52 is, for example, a microcomputer including a hardware processor such as a CPU. The acceleration control unit 52 controls the acceleration unit 51 based on an instruction from the driving assistance device 20 to control the acceleration of the vehicle 10. The acceleration unit sensor 53 is, for example, a position sensor, and detects a position of an accelerator pedal included in the acceleration unit 51. The acceleration unit sensor 53 outputs the detected accelerator pedal position to the in-vehicle network NT.

The steering system 60 includes a steering unit 61, a steering control unit 62, and a steering unit sensor 63, and controls the advancing direction of the vehicle 10.

The steering unit 61 is a device including, for example, a wheel, a steering wheel, or the like, and steers the advancing direction of the vehicle 10 by turning the turning wheel of the vehicle 10. The steering control unit 62 is, for example, a microcomputer including a hardware processor such as a CPU. The steering control unit 62 controls the steering unit 61 based on an instruction from the driving assistance device 20 to control the advancing direction of the vehicle 10. The steering unit sensor 63 is an angle sensor including, for example, a Hall element and the like, and detects a steering angle which is a rotation angle of the steering unit 61. The steering unit sensor 63 outputs the detected steering angle of the steering unit 61 to the in-vehicle network NT.

The transmission system 70 includes a transmission unit 71, a transmission control unit 72, and a transmission unit sensor 73, and controls a transmission ratio of the vehicle 10.

The transmission unit 71 is, for example, a device including a shift lever and the like, and changes the transmission ratio of the vehicle 10. The transmission control unit 72 is, for example, a microcomputer including a hardware processor such as a CPU. The transmission control unit 72 controls the transmission unit 71 based on an instruction from the driving assistance device 20 to control the transmission ratio of the vehicle 10. The transmission unit sensor 73 is, for example, a position sensor, and detects a position of a shift lever included in the transmission unit 71. The transmission unit sensor 73 outputs the detected shift lever position to the in-vehicle network NT.

The vehicle speed sensor 83 includes, for example, a Hall element provided in the vicinity of the wheel 13 of the vehicle 10, and detects the rotation amount of the wheel 13 or the rotation number per unit time. The vehicle speed sensor 83 outputs the wheel speed pulse number indicating the detected rotation amount or rotation number to the in-vehicle network NT as a sensor value for calculating the speed (vehicle speed) of the vehicle 10. The driving assistance device 20 can calculate the speed, the movement amount, and the like of the vehicle 10 based on the sensor value acquired from the vehicle speed sensor 83.

The monitor device 30 is provided on a dashboard or the like in the vehicle compartment of the vehicle 10, and includes a display unit 31 and an input unit 32.

The display unit 31 is a display device such as, for example, a liquid crystal display (LCD) or an organic electroluminescent (EL) display (OELD). The display unit 31 displays, for example, an image based on image data transmitted from the driving assistance device 20, an image for receiving an operation instruction for instructing switching between automatic driving and manual driving, and the like.

The input unit 32 is, for example, a touch panel provided on a display screen of the display unit 31. The input unit 32 is configured to transmit the contents displayed on the display screen by the display unit 31. Accordingly, the input unit 32 allows the occupant to visually recognize the display content of the display unit 31.

The input unit 32 receives an instruction input by the occupant touching a position corresponding to the display content of the display unit 31, and transmits the instruction to the driving assistance device 20 via the in-vehicle network NT. Note that the input unit 32 is not limited to the touch panel, and may be a push-button hard switch or the like.

The portable terminal 100 is a computer including a CPU 111, a communication control circuit 112, an input/output control circuit 113, an SSD 114, a ROM 115, and a RAM 116. In addition, the portable terminal 100 includes an output unit 117 and an input unit 118. The portable terminal 100 is possessed by a user such as a driver of the vehicle 10 and is configured so as to be carried by the user. As an example, the portable terminal 100 may be a smartphone, a portable phone, a tablet terminal, or the like.

The CPU 111 is an example of a hardware processor, reads a program stored in a nonvolatile storage device such as the ROM 115, and executes various arithmetic processing and control according to the program.

The ROM 115 stores various programs, parameters necessary for executing the programs, and the like. The RAM 116 temporarily stores various data used in the calculation by the CPU 11. The SSD 114 is a rewritable nonvolatile storage device, and maintains data even when the power of the portable terminal 100 is turned off.

The communication control circuit 112 mainly executes processing related to transmission and reception of information to and from the driving assistance device 20 of the arithmetic processing performed by the portable terminal 100. The input/output control circuit 113 causes the output unit 117 to output information, notification, and the like regarding driving assistance from the driving assistance device 20 received by the communication control circuit 112. In addition, the input/output control circuit 113 receives operation content input from the input unit 118, and causes the operation content to be transmitted from the communication control circuit 112 to the driving assistance device 20.

The output unit 117 is, for example, a display device such as a liquid crystal display or an organic EL display. The output unit 117 displays, for example, an image based on image data transmitted by the driving assistance device 20, an image for receiving an operation instruction regarding driving assistance, and the like. The output unit 117 may include a speaker or the like capable of outputting a voice, an alarm, or the like.

The input unit 118 is, for example, a touch panel or the like provided in the output unit 117 which is a display device or the like. The input unit 118 receives an instruction input by the user touching a position corresponding to the display content of the display device. Note that the input unit 118 may include a push-button hard switch such as a keyboard, or the like.

Figure 3:
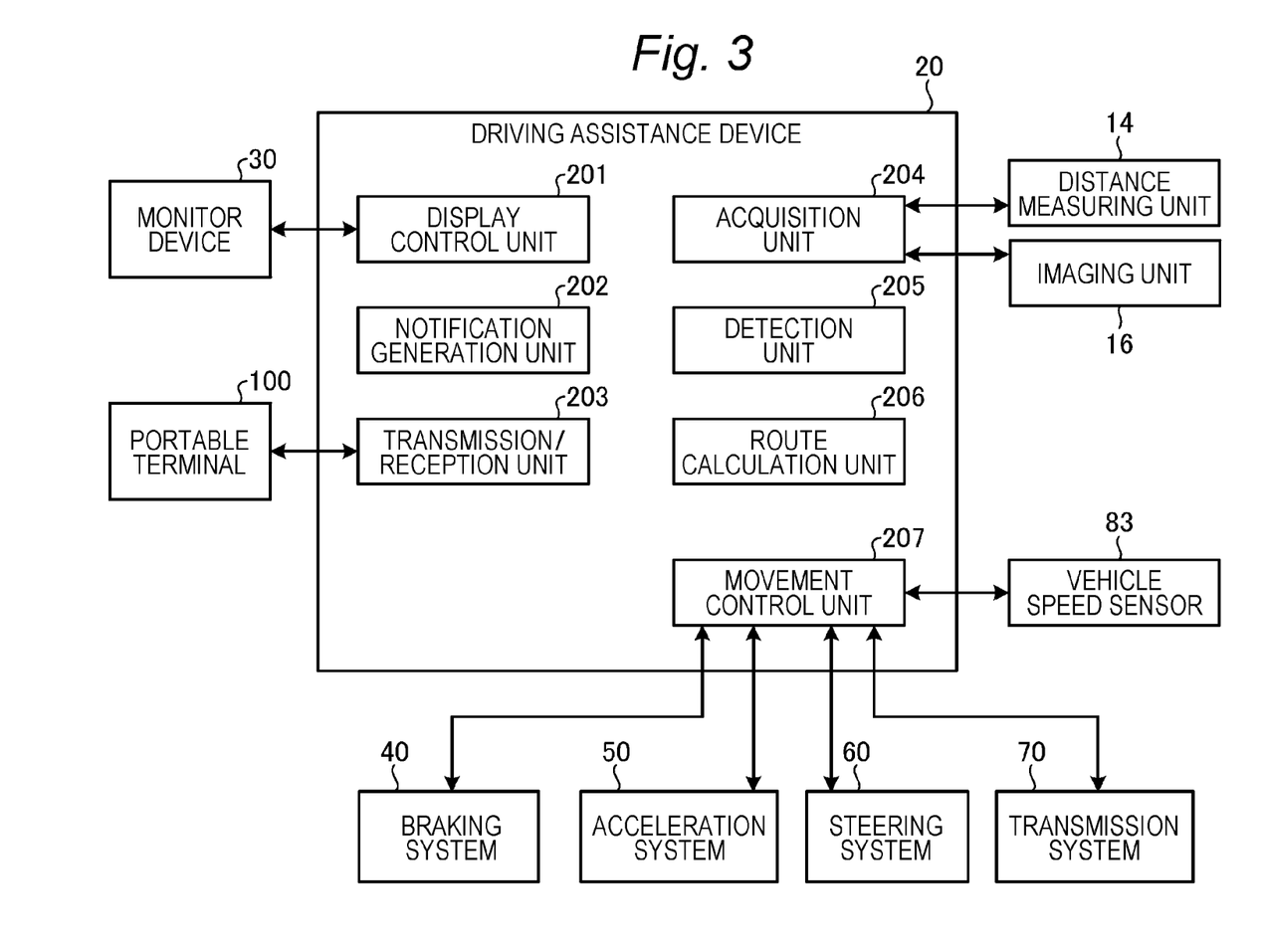
FIG. 3 is a block diagram illustrating an example of a functional configuration of the driving assistance device according to the embodiment.

FIG. 3 is a block diagram illustrating an example of a functional configuration of the driving assistance device 20 according to the embodiment. As illustrated in FIG. 3, the driving assistance device 20 includes a display control unit 201, a notification generation unit 202, a transmission/reception unit 203, an acquisition unit 204, a detection unit 205, a route calculation unit 206, and a movement control unit 207 as functional units.

These functional units are implemented, for example, by the above-described CPU 21 reading a program stored in a storage device such as the ROM 25 and executing the program. Alternatively, under the control of the CPU 21 according to the program, the communication control circuit 22, the display control circuit 23, the SSD 24, and the like operate to realize the above.

Some or all of these functional units may be configured by hardware such as a circuit including an application specific integrated circuit (ASIC).

The display control unit 201 generates contents to be displayed on the display unit 31 of the monitor device 30 and displays the contents on the display unit 31. That is, the display control unit 201 causes the display unit 31 to display, for example, a notification screen indicating that a parking area where the vehicle 10 can be parked has been detected, a selection screen for starting, interrupting, or canceling the driving assistance, a peripheral image of the vehicle 10 receiving driving assistance, and the like.

The notification generation unit 202 generates a notification related to driving assistance to be transmitted to the portable terminal 100. That is, the notification generation unit 202 generates notification contents to the user such as start, interruption, or stop of driving assistance.

The transmission/reception unit 203 transmits and receives information to and from the portable terminal 100. That is, for example, the transmission/reception unit 203 receives the positional information of the portable terminal 100 from the portable terminal 100. The positional information of the portable terminal 100 is information indicating the location of the portable terminal 100, for example, a radio wave emitted by the portable terminal 100 or an operation signal of the portable terminal 100 by the user. Furthermore, the transmission/reception unit 203 transmits the notification generated by the notification generation unit 202 to the portable terminal 100. Moreover, the transmission/reception unit 203 receives an operation instruction or the like of the user with respect to the transmitted notification from the portable terminal 100.

The acquisition unit 204 acquires, as peripheral information of the vehicle 10, transmission/reception wave information of a sound wave from the distance measuring unit 14 and an imaged image of the periphery of the vehicle 10 from the imaging unit 16.

The detection unit 205 detects an obstacle, a parking section, a parking area, and the like at the periphery of the vehicle 10 based on the peripheral information acquired by the acquisition unit 204.

The obstacle is, for example, various objects such as another vehicle, a wall, a pillar, a fence, a protrusion, a step, and a wheel stopper. Furthermore, the obstacle may be, for example, a person walking through a parking lot, a driver who got off from the vehicle 10 during the driving assistance, or the like.

The parking section is provided so as to park the vehicle 10, and is an area divided by, for example, a dividing line, a frame line, a straight line, a band, a step, or the like. The parking area is a parking section where the vehicle 10 can be parked, that is, a parking section where there is no obstacle such as another vehicle that becomes an obstacle in the parking of the vehicle 10.

The detection unit 205 detects the presence or absence of an obstacle, the distance from the vehicle 10 to the obstacle, and the like, for example, based on the detection result of the distance measuring unit 14. Furthermore, the detection unit 205 detects, for example, the presence or absence of an obstacle, a parking section, positions (orientations) of the parking section with respect to the vehicle 10, and shapes, sizes, heights, and the like thereof by image processing based on an image imaged by the imaging unit 16.

By combining these detection results, the detection unit 205 extracts information such as whether or not there is an obstacle at the periphery of the vehicle 10, whether or not the obstacle affects the traveling of the vehicle 10, whether or not there is a parking section at a periphery of the vehicle 10, whether or not the vehicle 10 can be parked in a parking section, that is, whether or not it can be used as the parking area, or the like.

The route calculation unit 206 calculates a target position for guiding the vehicle 10 based on the detection result by the detection unit 205, and calculates a movement route for moving the vehicle 10 to the target position.

In a case where the vehicle 10 is to be parked (entered), the parking area detected by the detection unit 205 becomes the target position. In a case where the vehicle 10 is to exit from the parking section, a predetermined place where the vehicle 10 can safely start traveling thereafter, such as on a passage provided between the plurality of parking sections, becomes the target position.

In addition, the route calculation unit 206 may calculate the steering wheel turn-back position as necessary. One or more steering wheel turn-back positions are set in a case where parking or exiting is difficult by one backward movement or forward movement.

The route calculation unit 206 calculates a movement route of the vehicle 10 from the current position of the vehicle 10 to the target position in order to guide the vehicle 10 to the target position calculated as described above. The movement route may include the steering wheel turn-back position as described above. In this case, the route calculation unit 206 calculates a movement route from the current position of the vehicle 10 to the target position through the steering wheel turn-back position.

The route calculation unit 206 calculates a movement route for parking, for example, backward parking, forward parking, parallel parking by backward movement, parallel parking by forward movement, or the like. In addition, the route calculation unit 206 calculates a movement route for exiting, for example, forward exiting, backward exiting, parallel exiting by forward movement, parallel exiting by backward movement, or the like.

The movement control unit 207 controls each unit of the vehicle 10 to move the vehicle 10 when the driving assistance of the vehicle 10. Specifically, the movement control unit 207 controls all or part of the braking system 40, the acceleration system 50, the steering system 60, and the transmission system 70 to move the vehicle 10 to the target position according to the movement route. At this time, the movement control unit 207 moves the vehicle 10 while receiving feedback from each of the sensors such as the braking unit sensor 43, the acceleration unit sensor 53, the steering unit sensor 63, the transmission unit sensor 73, and the vehicle speed sensor 83.

In addition, the movement control unit 207 temporarily stops the vehicle 10 when the detection unit 205 detects an obstacle at a position that hinders the movement of the vehicle 10 on the movement route during the movement of the vehicle 10 according to the movement route. Furthermore, when the length of the movement route is shortened by greater than or equal to a predetermined distance due to an obstacle, the movement control unit 207 temporarily stops the driving assistance and waits for a predetermined time with the vehicle 10 remained stopped.

An obstacle that suddenly appears on or near the movement route during driving assistance may be a driver or the like who has got off the vehicle 10 during remote driving assistance. This is because the driver may temporarily get too close to the movement route in order to confirm the safety of the movement of the vehicle 10. In a case where the obstacle such as the driver moves from the movement route within a predetermined time, the movement control unit 207 restarts the driving assistance after obtaining an instruction from the driver or the like.

When an obstacle is detected but the length of the movement route is sufficiently maintained, the route calculation unit 206 recalculates the movement route, and the movement control unit 207 moves the vehicle 10 to the target position while avoiding the obstacle according to the recalculated movement route.

(Operation Example of Driving Assistance Device)

Next, an operation example of the driving assistance device 20 according to the embodiment will be described with reference to FIGS. 4 to 9. FIGS. 4 to 8 are schematic diagrams describing an example of an operation of parking assistance by the driving assistance device 20 according to the embodiment. In FIGS. 4 to 8, an example of a case in which the vehicle 10 is backward parked will be described.

Figure 4:
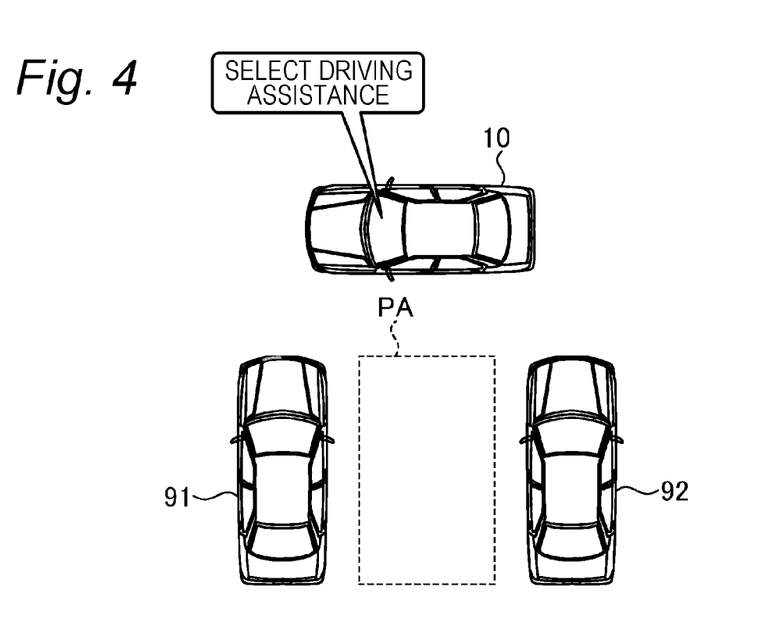
FIG. 4 is a schematic diagram describing an example of an operation of parking assistance by the driving assistance device according to the embodiment.

As illustrated in FIG. 4, it is assumed that one parking section, which is sandwiched between parking sections in which other vehicles 91 and 92 are parked, is vacant in a parking lot or the like in which a plurality of parking sections are arranged.

The detection unit 205 of the driving assistance device 20 mounted on the vehicle 10 detects, for example, a vacant parking section among the plurality of parking sections as a parking area PA where the vehicle 10 can be parked. The display control unit 201 of the driving assistance device 20 causes the display unit 31 of the monitor device 30 to display a selection screen for allowing the driver or the like to select whether or not to start driving assistance.

Figure 5:
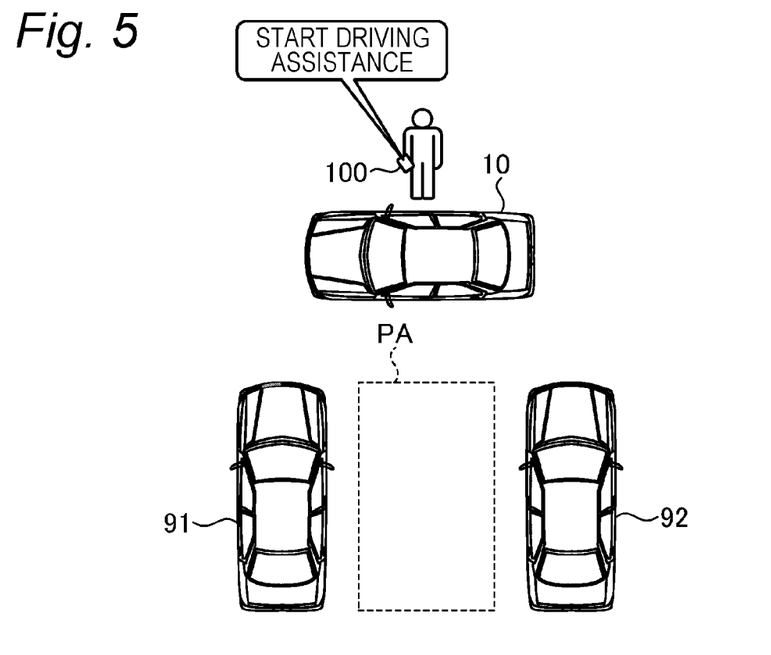
FIG. 5 is a schematic diagram describing an example of an operation of parking assistance by the driving assistance device according to the embodiment.

As illustrated in FIG. 5, it is assumed that the driver got off the vehicle 10 carrying the portable terminal 100 after selecting the start of driving assistance on the monitor device 30.

The transmission/reception unit 203 of the driving assistance device 20 receives positional information such as a radio wave or an operation signal transmitted from the portable terminal 100, and detects that the portable terminal 100 has moved to the outside of the vehicle 10. The driving assistance device 20 starts driving assistance when detected that the portable terminal 100 has moved to the outside of the vehicle 10 after the driver selects the start of driving assistance.

At this time, the notification generation unit 202 may generate a notification such as "driving assistance start", and the transmission/reception unit 203 may transmit the notification to the portable terminal 100 and cause the display device of the portable terminal 100 to display the notification.

Figure 6:
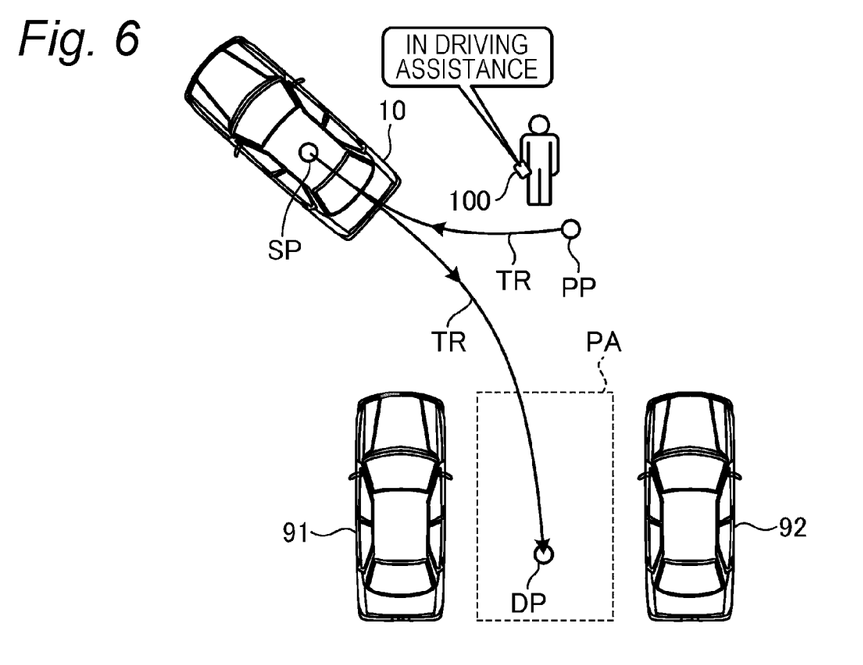
FIG. 6 is a schematic diagram describing an example of an operation of parking assistance by the driving assistance device according to the embodiment.

As illustrated in FIG. 6, the route calculation unit 206 of the driving assistance device 20 calculates the movement route TR from the current position PP of the vehicle 10 to the target position DP located in the parking area PA through the steering wheel turn-back position SP in the forward direction of the vehicle 10 and in the backward direction of the vehicle 10 from the steering wheel turn-back position SP.

In addition, the movement control unit 207 of the driving assistance device 20 moves the vehicle 10 on the movement route TR according to the calculation result of the route calculation unit 206. At this time, the notification generation unit 202 may generate a notification such as "in driving assistance" indicating that the vehicle 10 is currently receiving driving assistance, and the transmission/reception unit 203 may transmit the notification to the portable terminal 100 and cause the display device of the portable terminal 100 to display the notification.

Figure 7:
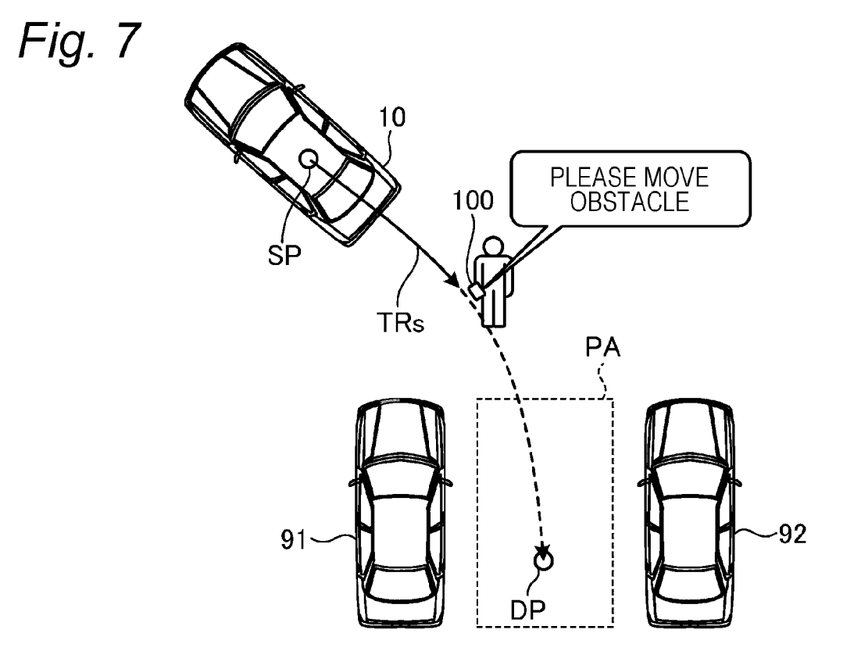
FIG. 7 is a schematic diagram describing an example of an operation of parking assistance by the driving assistance device according to the embodiment.

As illustrated in FIG. 7, it is assumed that a driver enters the movement route TR of the vehicle 10 during driving assistance. The detection unit 205 of the driving assistance device 20 detects this as an obstacle, and the movement control unit 207 determines, from the positional relationship between the detected obstacle and the movement route TR of the vehicle 10, whether there is a possibility that the obstacle hinders the movement of the vehicle 10 on the movement route TR, such as the risk of collision with the obstacle, in a case where the vehicle 10 is continued to be moved. When determined that the obstacle may hinder the movement of the vehicle 10, the movement control unit 207 temporarily stops the vehicle 10.

In addition, the movement control unit 207 determines whether or not the length of the movement route TR is shortened by the obstacle and the shortened length is longer than or equal to a predetermined distance. At this time, the predetermined distance serving as a criterion is, for example, with this distance as the length of the movement route, a distance at which it is difficult to continue the driving assistance while avoiding the obstacle.

When the shortened length of the movement route TRs is longer than or equal to the predetermined distance, the movement control unit 207 temporarily interrupts the driving assistance and waits for a predetermined time with the vehicle 10 remained stopped.

During standby of the movement control unit 207, the notification generation unit 202 generates a notification that prompts the user of the portable terminal 100 to move the obstacle, such as "Please move obstacle". The transmission/reception unit 203 transmits the notification to the portable terminal 100 and causes the display device of the portable terminal 100 to display the notification.

As in the example of FIG. 7, in a case where the obstacle is the driver or the like who is the user of the portable terminal 100, it is possible to make the driver or the like aware that the driver or the like has entered the movement route TR of the vehicle 10 by the above notification, and to encourage the driver or the like to take an action of moving away from the movement route TR.

Figure 8:
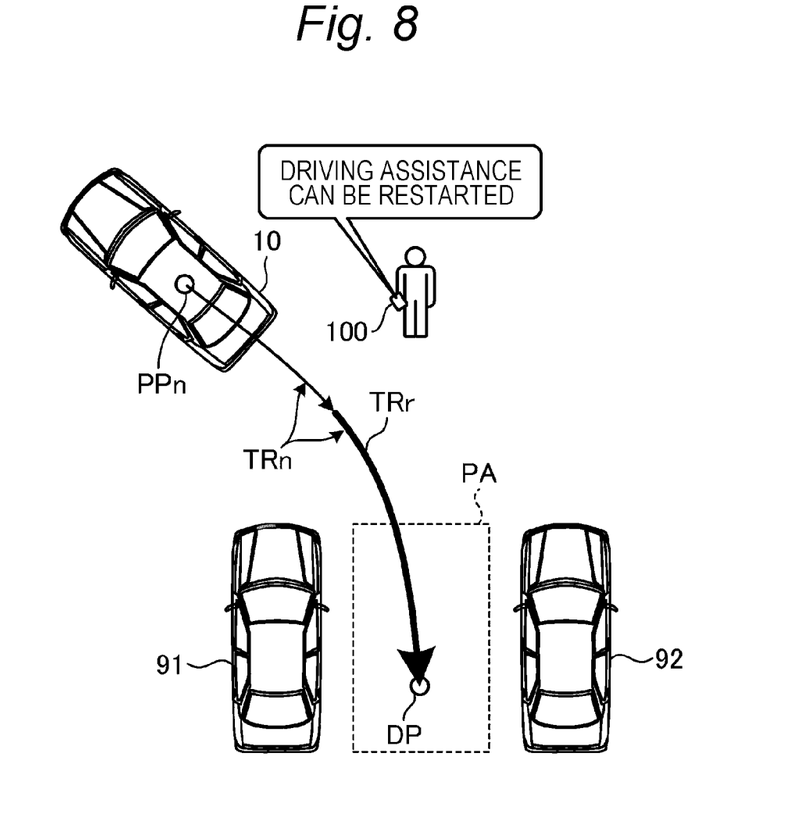
FIG. 8 is a schematic diagram describing an example of an operation of parking assistance by the driving assistance device according to the embodiment.

As illustrated in FIG. 8, for example, when an obstacle is not detected from a position that hinders the movement of the vehicle 10 by the driver moving or the like, the movement route TRr shortened by the obstacle is recovered.

The notification generation unit 202 generates a notification, such as "driving assistance can be restarted", requesting the user of the portable terminal 100 to give a restart instruction of the driving assistance. The transmission/reception unit 203 transmits the notification to the portable terminal 100 and causes the display device of the portable terminal 100 to display the notification. When the driver or the like gives an instruction to restart the driving assistance from the portable terminal 100, driving assistance by the driving assistance device 20 is restarted.

As described above, in the driving assistance device 20, the driving assistance is restarted after confirming the intention of the user again after the driver or the like has moved, so that an operation not intended by the user is suppressed from being performed.

That is, the route calculation unit 206 calculates again the movement route TRn from the current position PPn of the vehicle 10 to the target position DP in the parking area PA including the recovered movement route TRr. The movement control unit 207 starts the movement of the vehicle 10 from the current position PPn.

In this way, a sufficiently long movement route TRn including the recovered movement route TRr can be taken by recalculating the movement route TRn after waiting for the movement of the obstacle, and the guidance of the vehicle 10 to the target position DP becomes easy. Furthermore, by recalculating the movement route TRn on the basis of the current situation of the vehicle 10, the vehicle 10 can be controlled with high accuracy and guided to the desired target position DP.

On the other hand, another obstacle other than the driver or the like may enter a position that hinders the movement of the vehicle 10 on the movement route TR during the driving assistance. Such a case is illustrated in FIG. 9.

Figure 9:
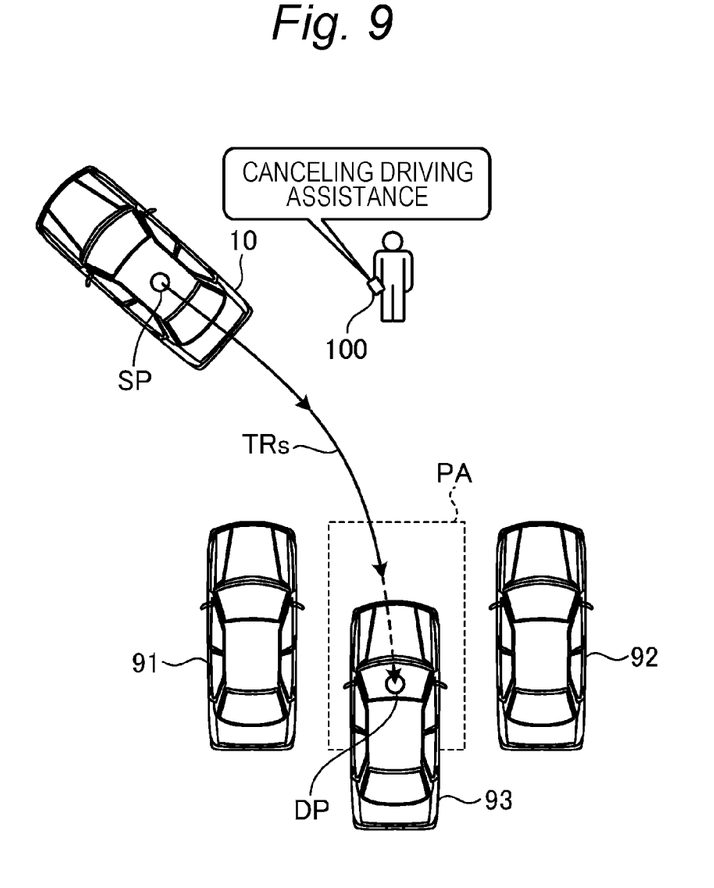
FIG. 9 is a schematic diagram describing an example of an operation when the driving assistance device according to the embodiment cancels the driving assistance.

FIG. 9 is a schematic diagram describing an example of an operation when the driving assistance device 20 according to the embodiment cancels the driving assistance.

As illustrated in FIG. 9, it is assumed that another vehicle 93 has entered the parking area PA during driving assistance of the vehicle 10 to the parking area PA. In addition, it is assumed that the shortened length of the movement route TRs is longer than or equal to the predetermined distance. The movement control unit 207 temporarily interrupts driving assistance and waits for a predetermined time in a state where the vehicle 10 is stopped.

In the example of FIG. 9, the detected obstacle is not a driver or the like but another vehicle 93. Therefore, it is assumed that the vehicle 93 continues to be detected as an obstacle even after a predetermined time has elapsed. In this case, the driving assistance device 20 determines that guidance of the vehicle 10 to the target position DP is difficult, and cancels (cancels) the driving assistance.

The notification generation unit 202 generates a notification, such as "Canceling driving assistance", notifying the user of the portable terminal 100 of the cancellation of the driving assistance. The transmission/reception unit 203 transmits the notification to the portable terminal 100 and causes the display device of the portable terminal 100 to display the notification.

In the examples of FIGS. 4 to 9 described above, the case where the driving assistance device 20 performs driving assistance by backward parking has been described. However, even in the case of forward parking, forward or backward exiting, parallel parking by backward or forward movement, or parallel exiting by forward or backward movement, the driving assistance device 20 similarly assists the driving of the vehicle 10.

(Process Example of Driving Assistance Device)

Figure 10:
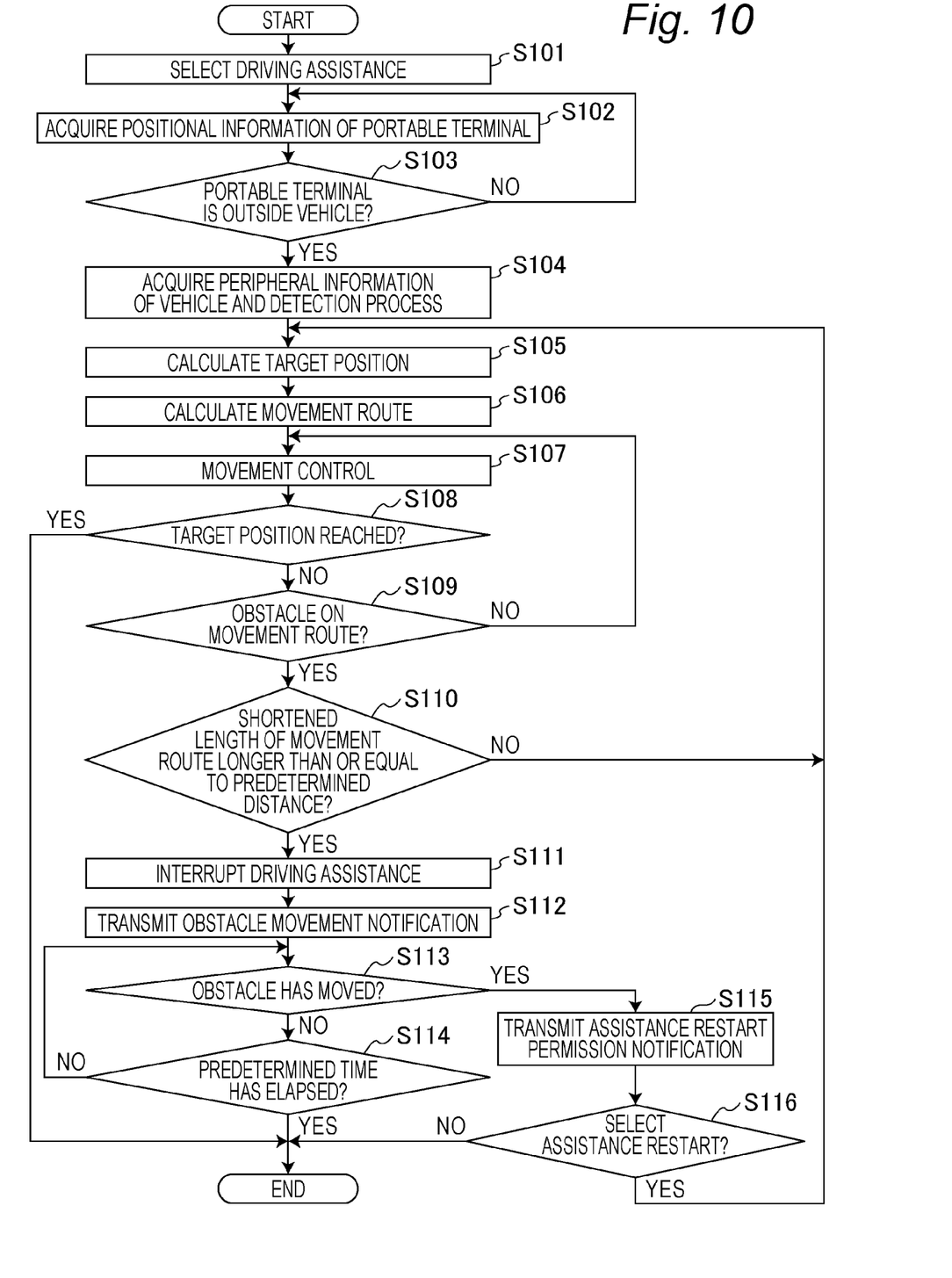
FIG. 10 is a flowchart illustrating an example of a procedure of a driving assistance process by the driving assistance device according to the embodiment.

Next, an example of a driving assistance process by the driving assistance device 20 according to the embodiment will be described with reference to FIG. 10. FIG. 10 is a flowchart illustrating an example of a procedure of a driving assistance process by the driving assistance device 20 according to the embodiment.

As illustrated in FIG. 10, when selection to provide driving assistance is made from the input unit 32 of the monitor device 30 (step S101), the transmission/reception unit 203 acquires positional information from the portable terminal 100 (step S102), and determines whether or not the portable terminal 100 has moved to the outside of the vehicle 10 (step S103). The transmission/reception unit 203 continues to acquire the positional information (step S102) until detection is made that the portable terminal 100 has moved to the outside of the vehicle 10 (step S103: No).

If detection is made that the portable terminal 100 has moved to the outside of the vehicle 10 (step S103: Yes), the acquisition unit 204 of the driving assistance device 20 acquires peripheral information of the vehicle 10 from the distance measuring unit 14 and the imaging unit 16, and the detection unit 205 performs various types of detection processes necessary for driving assistance (step S104).

Specifically, the detection unit 205 detects the presence or absence of an obstacle or the like at the periphery of the vehicle 10 based on the acquired peripheral information of the vehicle 10, and detects the position where the vehicle 10 can stop after detecting the parking area PA or exiting the parking area PA according to the content of the selected driving assistance.

Note that acquisition of the peripheral information by the acquisition unit 204 and various types of detection by the detection unit 205 may be started before this timing. In addition, the acquisition unit 204 continues to acquire the peripheral information at least until the driving assistance process is terminated. Furthermore, the detection unit 205 continues various types of detection processes necessary for the driving assistance, such as detection of an obstacle at the periphery of the vehicle 10, at least until the driving assistance process is terminated.

The route calculation unit 206 calculates a target position DP such as a predetermined position in the parking area PA or a stop position of the vehicle 10 after exiting from the parking area PA based on the detection result by the detection unit 205 (step S105). In addition, the route calculation unit 206 may calculate the steering wheel turn-back position SP as necessary.

The route calculation unit 206 calculates a movement route TR from the current position PP of the vehicle 10 to the target position DP via the steering wheel turn-back position SP in some cases (step S106).

The movement control unit 207 controls the movement of the vehicle 10 according to the movement route TR calculated by the route calculation unit 206 (step S107). When the vehicle 10 reaches the target position DP (step S108: Yes), the movement control unit 207 stops the vehicle 10 and terminates the driving assistance process.

Until the vehicle 10 reaches the target position DP (step S108: No), the movement control unit 207 monitors whether or not an obstacle is detected at a position that hinders the vehicle 10 moving on the movement route TR based on the detection result of the detection unit 205 (step S109). If no obstacle is detected (step S109: No), the movement control unit 207 continues the movement control of the vehicle 10 (step S107).

If an obstacle is detected at a position that hinders the vehicle 10 moving on the movement route TR (step S109: Yes), the movement control unit 207 temporarily stops the vehicle 10, and determines whether or not a length of the movement route TR shortened by the obstacle is longer than or equal to a predetermined distance (step S110).

If the shortened length of the movement route TRs is less than the predetermined distance and the length of the movement route TRs is sufficiently maintained (step S110: No), the route calculation unit 206 recalculates the target position and the movement route TR (steps S105 and S106), and the movement control unit 207 continues the movement control of the vehicle 10 according to the recalculated movement route TR (step S107).

If the shortened length of the movement route TRs is longer than or equal to the predetermined distance (step S110: Yes), the movement control unit 207 interrupts the driving assistance (step S111). When the driving assistance is interrupted, the notification generation unit 202 generates a notification prompting the movement of the obstacle, and the transmission/reception unit 203 transmits the notification to the portable terminal 100 (step S112).

The movement control unit 207 determines whether or not the obstacle has moved based on the detection result of the detection unit 205 (step S113). If the obstacle has not moved, the movement control unit 207 determines whether or not a predetermined time has elapsed since the interruption of the driving assistance (step S114). The movement control unit 207 repeats the obstacle confirmation process (step S113) for a predetermined time (step S114: No).

If the predetermined time has elapsed (step S114: Yes) without the obstacle moving (step S113: No), the driving assistance device 20 cancels the driving assistance process.

If the obstacle has moved within the predetermined time (step S113: Yes), the notification generation unit 202 generates a notification requesting for permission to restart the driving assistance, and the transmission/reception unit 203 transmits the notification to the portable terminal 100 (step S115). The movement control unit 207 determines whether or not restart of the driving assistance is selected by the user (step S116).

If the user selects restart of the driving assistance (step S116: Yes), the driving assistance device 20 repeats the processes from step S105. That is, the route calculation unit 206 calculates the target position DP based on the current position PPn of the vehicle 10 (step S105), recalculates the movement route TRn of the vehicle 10 from the current position PPn to the target position DP (step S106), and the movement control unit 207 controls the movement of the vehicle 10 according to the recalculated movement route TRn (step S107).

If the user does not select restart of the driving assistance (step S116: No), the driving assistance device 20 cancels the driving assistance.

The driving assistance process by the driving assistance device 20 of the embodiment is thereby terminated.

Overview

A driving assistance device assists driving of a vehicle based on peripheral information of the vehicle from various sensors such as a distance measuring unit and an imaging unit. In recent years, development is progressing in a driving assistance device that remotely assists entering or exiting of a vehicle to or from a parking area in a state where a driver has got off the vehicle.

However, in the remote driving assistance, there is a case where a driver who got off the vehicle enters a movement route of the vehicle in order to perform safety confirmation and the like of the periphery and the advancing direction of the vehicle. In this case, since the driving assistance device recognizes the driver as an obstacle, the driving assistance device may repeat turning back of the steering wheel many times in order to avoid the obstacle, or the driving assistance may be canceled because it becomes impossible to guide the vehicle to the target position.

According to the driving assistance device 20 of the embodiment, when an obstacle is detected at a position that hinders the movement of the vehicle 10 on the movement route TR, and when the length of the movement route TR is shortened by the obstacle and the shortened length is longer than or equal to a predetermined distance, the driving assistance is temporarily interrupted, and it is waited for a predetermined time until the obstacle is moved from the position hindering the movement.

As a result, when the obstacle is the driver or the like who has entered the movement route TR, the driving assistance can be restarted after waiting for the driver to move. Therefore, it is possible to suppress an increase in the number of turning backs of a steering wheel in an attempt to forcibly continue the driving assistance according to the shortened movement route TRs, or to suppress a situation in which the continuation of the driving assistance becomes impossible and the driving assistance is canceled.

According to the driving assistance device 20 of the embodiment, when an obstacle is detected, a notification requesting for the movement of the obstacle is transmitted to the portable terminal 100. As a result, in a case where the obstacle is the driver or the like who is the user of the portable terminal 100, it is possible to make the driver realize entry into the movement route TR, and it is possible to encourage the driver or the like to leave from the movement route TR of the vehicle 10.

In the embodiment described above, the driving assistance device 20 is mounted on the vehicle 10, but the driving assistance device 20 may not necessarily be mounted on the vehicle 10. For example, the driving assistance device may acquire peripheral information of the vehicle from various sensors at a position away from the vehicle to remotely perform driving assistance of the vehicle.

A driving assistance device is a driving assistance device that provides driving assistance to a vehicle including a sensor that collects peripheral information in accordance with an instruction from a terminal possessed by a user of the vehicle, the driving assistance device including: a route calculation unit that calculates a movement route of the vehicle to a target position based on the peripheral information from the sensor; a detection unit that detects an obstacle at a periphery of the vehicle moving through the movement route based on the peripheral information from the sensor; and a movement control unit that moves the vehicle along the movement route; where the movement control unit temporarily interrupts the driving assistance and waits for a predetermined time until the obstacle moves from a position that hinders the movement when the obstacle is detected at a position that hinders the movement of the vehicle on the movement route and a length of the movement route shortened by the obstacle is longer than or equal to a predetermined distance.

According to this configuration, it is possible to suppress cancellation of driving assistance due to entry of the user into the movement route.

Furthermore, in the driving assistance device described above, the movement control unit restarts the driving assistance when an instruction from the terminal is made after the obstacle has moved within the predetermined time.

According to this configuration, after the obstacle has moved, the driving assistance is restarted after the intention of the user is confirmed again, so that an operation not intended by the user can be suppressed from being performed.

The driving assistance device described above further includes a transmission/reception unit that transmits, to the terminal, a notification requesting for movement of the obstacle when the obstacle is detected.

According to this configuration, in a case where the obstacle is a user or the like, the user can be made aware of entry to the movement route.

A vehicle is a vehicle mounted with a sensor that collects peripheral information and a driving assistance device that provides driving assistance in accordance with an instruction from a terminal possessed by a user, the driving assistance device including: a route calculation unit that calculates a movement route of the vehicle to a target position based on the peripheral information from the sensor; a detection unit that detects an obstacle at a periphery of the vehicle moving through the movement route based on the peripheral information from the sensor; and a movement control unit that moves the vehicle along the movement route, where the movement control unit temporarily interrupts the driving assistance and waits for a predetermined time until the obstacle moves from a position that hinders the movement when the obstacle is detected at a position that hinders the movement of the vehicle on the movement route and a length of the movement route shortened by the obstacle is longer than or equal to a predetermined distance.

According to this configuration, it is possible to suppress cancellation of driving assistance due to entry of the user into the movement route.

Furthermore, in the vehicle described above, the movement control unit restarts the driving assistance when an instruction from the terminal is made after the obstacle has moved within the predetermined time.

According to this configuration, after the obstacle has moved, the driving assistance is restarted after the intention of the user is confirmed again, so that an operation not intended by the user can be suppressed from being performed.

The vehicle described above further includes a transmission/reception unit that transmits, to the terminal, a notification requesting for movement of the obstacle when the obstacle is detected.

According to this configuration, in a case where the obstacle is a user or the like, the user can be made aware of entry to the movement route.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A driving assistance device that provides driving assistance to a vehicle including a sensor that collects peripheral information in accordance with an instruction from a terminal possessed by a user of the vehicle, the driving assistance device comprising:
   a route calculation unit that calculates a movement route of the vehicle to a target position based on the peripheral information from the sensor;
   a detection unit that detects an obstacle at a periphery of the vehicle moving through the movement route based on the peripheral information from the sensor; and
   a movement control unit that moves the vehicle along the movement route, wherein the movement control unit temporarily interrupts the driving assistance and waits for a predetermined time until the obstacle moves from a position that hinders the movement when the obstacle is detected at a position that hinders the movement of the vehicle on the movement route and a length of the movement route shortened by the obstacle is longer than or equal to a predetermined distance.

2. The driving assistance device according to claim 1, wherein the movement control unit restarts the driving assistance when an instruction from the terminal is made after the obstacle has moved within the predetermined time.

3. The driving assistance device according to claim 1, further comprising a transmission/reception unit that transmits, to the terminal, a notification requesting for movement of the obstacle when the obstacle is detected.

4. A vehicle mounted with a sensor that collects peripheral information and a driving assistance device that provides driving assistance in accordance with an instruction from a terminal possessed by a user, wherein the driving assistance device includes a route calculation unit that calculates a movement route of the vehicle to a target position based on the peripheral information from the sensor, a detection unit that detects an obstacle at a periphery of the vehicle moving through the movement route based on the peripheral information from the sensor, and a movement control unit that moves the vehicle along the movement route, and the movement control unit temporarily interrupts the driving assistance and waits for a predetermined time until the obstacle moves from a position that hinders the movement when the obstacle is detected at a position that hinders the movement of the vehicle on the movement route and a length of the movement route shortened by the obstacle is longer than or equal to a predetermined distance.

5. The vehicle according to claim 4, wherein the movement control unit restarts the driving assistance when an instruction from the terminal is made after the obstacle has moved within the predetermined time.

6. The vehicle according to claim 4, further comprising a transmission/reception unit that transmits, to the terminal, a notification requesting for movement of the obstacle when the obstacle is detected.

\* \* \* \* \*